Patented Dec. 17, 1940

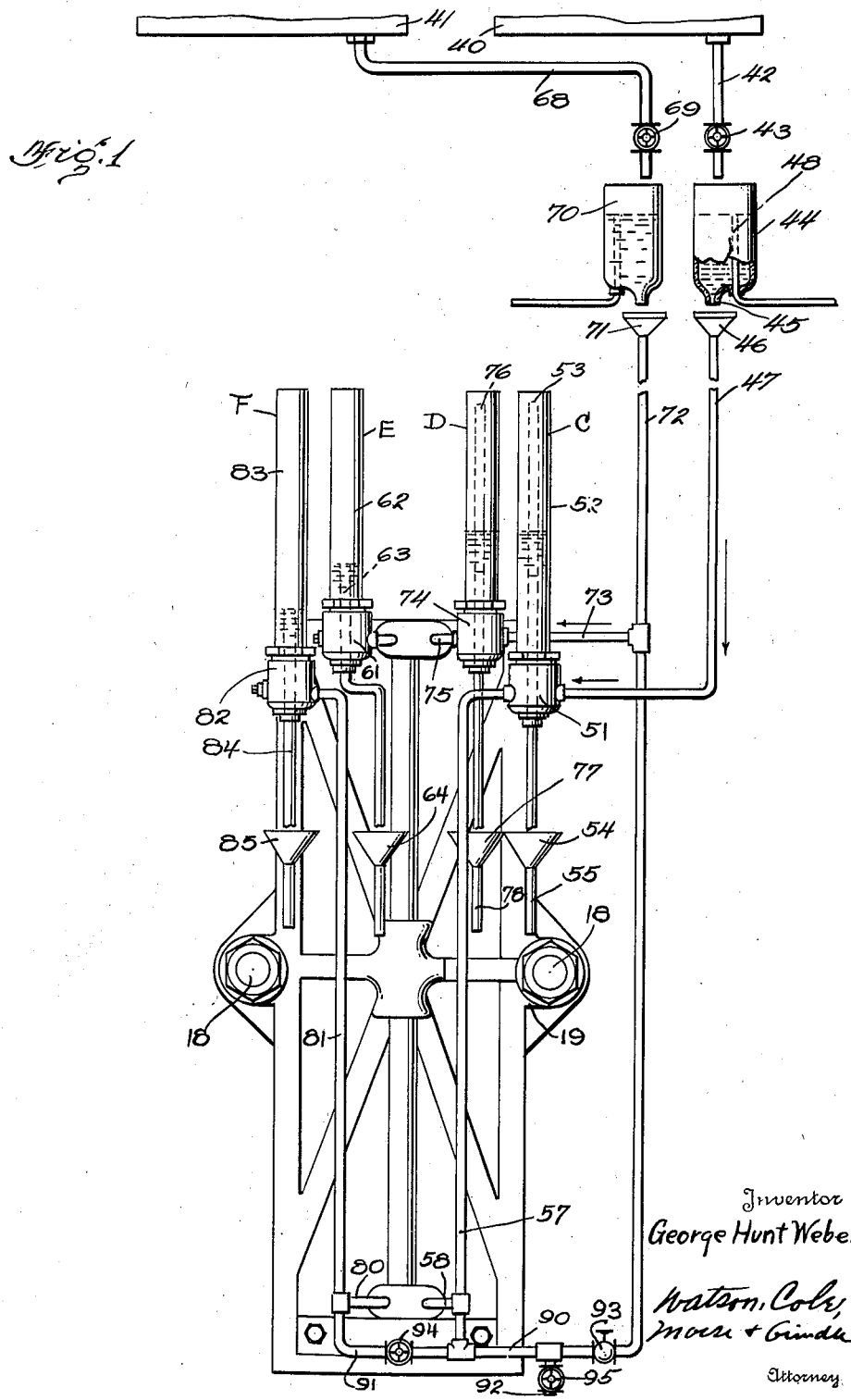

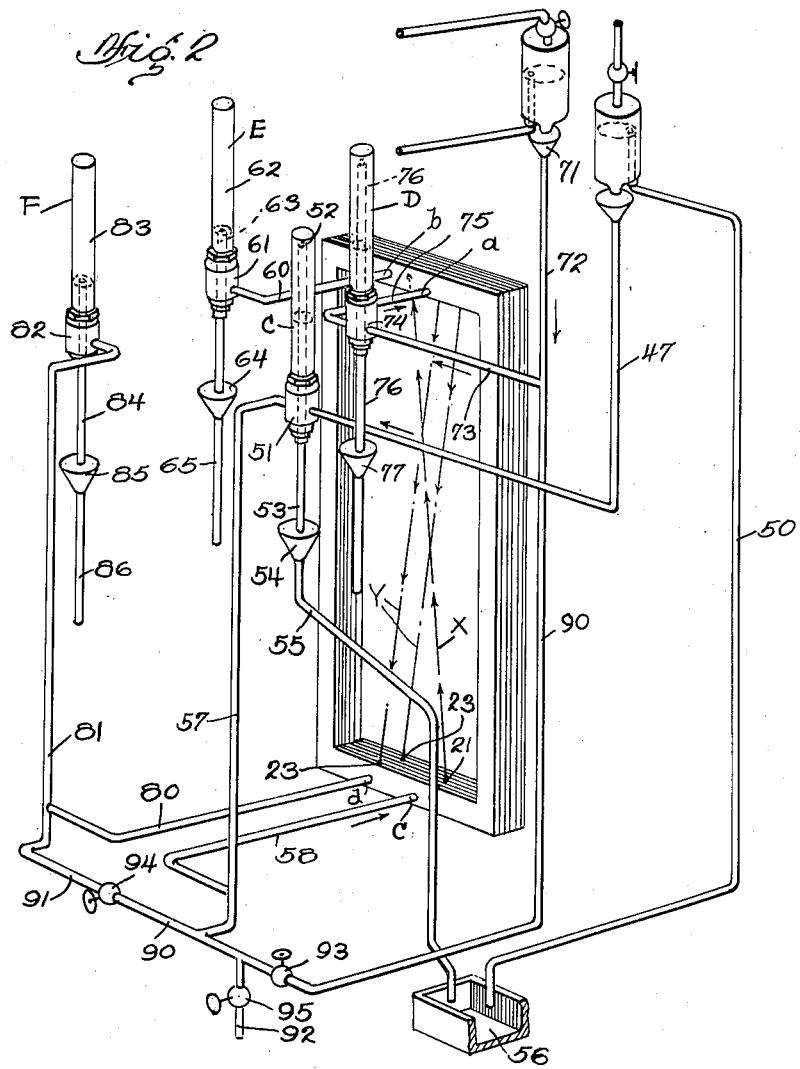

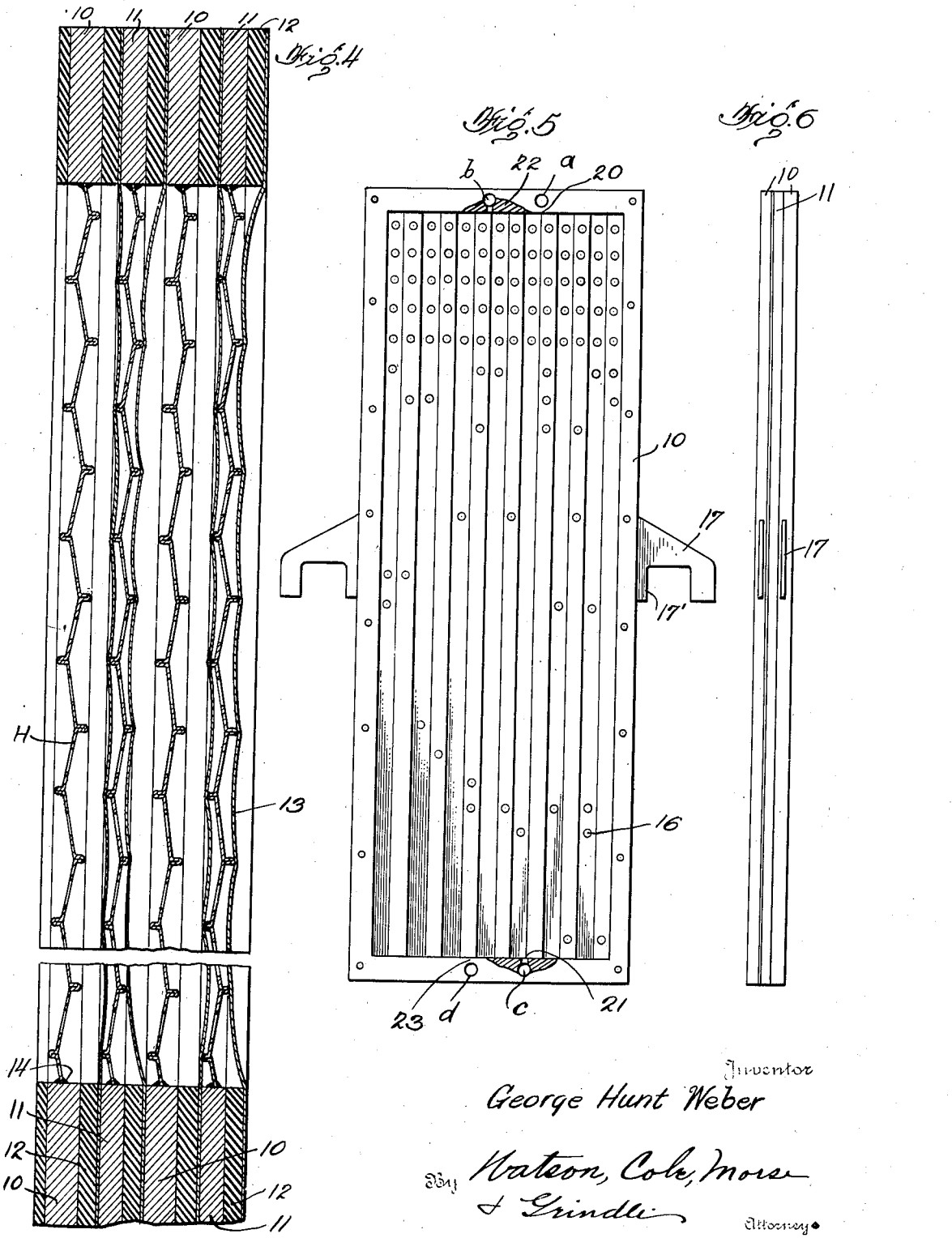

2,225,024

UNITED STATES PATENT OFFICE 2,225,024

DIALYZING APPARATUS

George Hunt Weber, Scarsdale, N. Y., assignor to Brosites Machine Company, Inc., New York, N. Y., a corporation of New York Application January 14, 1938, Serial No. 185,072

3 Claims. (Cl. 23—252)

The present invention relates to dialyzing apparatus for the refining and purifying of liquids and the recovery from waste liquids of some valuable constituent thereof.

Dialyzing apparatus, sometimes called osmogenes, have long been known and used in the industrial arts for various purposes and have been commonly employed for the refining or purification of molasses and syrups, for the recovery of caustic soda from waste solutions containing the same, and for the treatment of other liquids by the method involving the passage of one constituent of one liquid through a membrane into a second liquid, which method is generally designated osmose, the scientific aspects of which are well-known and require no detailed explanation. The process of osmose has of recent years been extensively employed in the rayon industry for the recovery of caustic soda from waste solutions containing the same, waste solutions resulting from the process of preparing viscose by the chemical treatment or cellulose. By dialysis a large proportion of the caustic soda which would otherwise be lost can be recovered and reused.

The present invention has for its purpose the provision of a dialyzing apparatus which is more efficient in operation than those heretofore designed or suggested and which, while particularly useful for the purpose of recovering caustic soda from caustic containing waste solutions in the rayon industry, is nevertheless readily applicable for the treatment or refining of any other liquids, such as molasses, which contain ingredients or constituents removable by the process of osmose. While this process may be practiced with but a single membrane in association with means for maintaining in contact with the opposite sides thereof two bodes of liquid, i. e., the liquid to be osmosed and the osmosing liquid, it is now common practice to dispose in substantially parallel planes a considerable number of such membranes defining intermediate liquid receiving cells which are relatively narrow and to pass one liquid downwardly through alternate cells and the second liquid upwardly through the remaining cells, each body of one liquid therefore lying between two bodies of the other liquid and being separated from such bodies only by the two membranes comprising the side walls of the cell. Means is provided for regulating the rate of flow of the counterflowing liquids and it is likewise generally customary to provide grids in association with the membranes to limit the possible sidewise deflection and stretching of such members thus preventing overstrain and rupture thereof.

The present invention is particularly useful when incorporated in a dialyzing apparatus of the type above generally described but the principles thereof may advantageously be employed in connection with dialyzing apparatus of all types. Improved flow regulating means is employed whereby the rates of flow of the two liquids through the apparatus may be most accurately controlled. The invention likewise contemplates the provision of readily adjustable means for regulating within limits the absolute static pressures existing within the cells of the apparatus and for closely regulating the relative static pressures of the two liquids in their respective cells without altering the rates of flow of such liquids so that each membrane of the apparatus may be subjected to the desired pressures upon the opposite sides or faces thereof. The flow controlling apparatus likewise includes means for the liberation of entrained air from the inflowing bodies of liquid, such air being allowed to escape just prior to the time of entrance of the liquid into the cells of the apparatus, a highly advantageous feature since the presence of air in such cells is highly detrimental and greatly decreases the efficiency of operation of the apparatus.

The means for supplying the two liquids to the apparatus is also so designed and constructed that the pressures existing in the cells will remain uniform during the operation of the apparatus, it being impossible for the pressure of either liquid in the apparatus to be accidentally raised or lowered, as might occur by sudden variations in rate of flow of the two liquids, were the improved pressure regulating means not employed. The apparatus also embodies certain features which render it safer for the operator than those of similar type heretofore used.

The invention contemplates also an improved type of membrane supporting grid whereby each membrane is adequately supported against lateral deflection in a novel manner and the circulation of liquid over the surface of the membrane on the side thereof which is engaged by the diaphragm is facilitated. Other mechanical features of improvement will be hereinafter more particularly pointed out in the description of that form of the invention which is illustrated in the accompanying drawings by way of example.

In the drawings:

Figure 1 is an end elevation of the dialyzing apparatus showing details of the fluid supply and removal means;

Figure 2 is a diagrammatic view of the principal elements of the apparatus, also showing the liquid conducting ducts or conduits;

Figure 3 is a top plan view of the apparatus, partially broken away;

Figure 4 is a horizontal section through a group of cells of the apparatus drawn upon a larger scale in order that the details of the grids may be more closely perceived;

Figure 5 is a front elevation of one of the membrane supporting grids and the frame within which it is secured, the frame being partly broken away; and Figure 6 is an edge view of two of the diaphragm supporting frames.

The apparatus may include a large number of grid supporting frames arranged in parallel planes but for the purpose of illustration only a few are shown. Each frame is rectangular and is the same in length and width as every other frame. Alternate frames, indicated at 10 are, however, slightly thicker than the intermediate frames 11, as may be clearly perceived from Figure 4. The frames may be fabricated of wood but are preferably fabricated of metal and each has, secured to one face thereof, a facing of rubber 12, the outer borders or margins of the membranes 13 being clamped between the rubber facing 12 of one frame and the adjacent surface of the next frame. Associated with each frame is a membrane supporting grid, indicated at H, this grid comprising a unitary metallic sheet the edges of which are secured, preferably by welds 14, to the inner surfaces of the frames respectively, and the grid having a series of membrane supporting ribs on each side, these ribs being in parallel relationship and alternate ribs facing in opposite directions. Intermediate adjacent ribs the grid is perforated at a large number of points, these perforations being indicated at 16. Preferably the grid is formed of a relatively thin but comparatively stiff sheet of metal, resistant to the action of the liquids to which it is exposed. Plastic or other materials can also be used, shaped in the form shown. The ribs are preferably formed by crimping operations and the rounded outer edges thereof are adapted to have line contact with the membranes. In the machines of this type in use today the grids are made of a series of bars usually rectangular in shape uniformly spaced across the frame opening. The points of support of the membranes are therefore diametrically opposite each other allowing the membranes to belly or sag due to the pressure between the lines of support. It can be seen that the points of sag of the membranes on each side of such a supporting grid are opposite each other and when the sag of the membranes becomes great enough the membranes will touch each other, causing a marked decrease in the operating efficiency of the machine.

The grid described above is designed in such a manner as to eliminate any possibilty of the membranes touching each other. The fact that alternate ribs are facing in opposite directions creates a condition where the line of support on one membrane is opposite a sagging section of the membrane on the opposite side of the grid. It can be readily seen, therefore, that this shape is a decided improvement in grid design. Each frame is provided with opposed laterally projecting brackets 17 which brackets have downwardly opening recesses 17' to receive the frame supporting rods 18, these rods being parallel and horizontally disposed.

The ends of each rod 18 project through aligned apertures formed in the end frame members 19 and 19a respectively, which members are drawn together by means of nuts to tightly clamp between them the intermediate frames and the membranes. The top and bottom members of each intermediate frame 10 or 11 are provided, respectively, with two circular apertures passing completely therethrough, the upper apertures in both frames 10 and 11 being indicated a and b and the lower apertures at c and d, as shown in Figure 5. These apertures extend likewise through the rubber facings of these frames and, when the frames are positioned as shown in Figures 2 and 4, each set of apertures forms a continuous duct or channel, the two upper channels being shown in Figure 3. These channels will be hereinafter referred to as channels a, b, c, and d, these letters also being the indicia of the respective apertures which, added together, comprise them. The ends of such channels adjacent end frame 19a are closed, as shown in Figure 3. The frame member 10 illustrated in Figure 5 is shown to have a small bore or duct 27 extending from the inner surface of the upper cross member of the frame into the aperture b and the aperture c formed in its lower cross member is intersected by a similar duct 21 drilled through the frame member from its inner surface. Frames 11 are provided with similar ducts leading inwardly from its passages a and d, the upper duct being indicated at 20 in Figure 3 and the mouths of the lower ducts at 23 in Figure 2.

The fluid supply means is designed and constructed to introduce liquid into the channels or ducts formed by groups of aligned apertures a and c. Liquid introduced into channel c will escape therefrom through apertures 21 there being one aperture 21 for each alternate frame, and hence the liquid thus escaping will pass into and eventually fill the alternate cells of the apparatus. Liquid introduced into channel a escapes through apertures 20 into the intermediate cells of the apparatus, to eventually fill these cells. In Figure 2 the arrows indicate the directions of flow of liquid through three adjacent cells, the direction of flow of liquid issuing from conduit c being indicated by the arrows X, this liquid eventually finding its way into the upper duct b through the aperture 22. Liquid discharged from conduit a through apertures 20 into the adjacent cells flows downwardly, as indicated by arrows Y, and eventually finds its way into conduit d through ducts 23. It will be understood that in the operation of the apparatus there will be this counterflow of liquid on opposite sides of each diaphragm throughout the apparatus, each cell, i. e., the space between adjacent diaphragms, either being in communication with the ducts c and b or with ducts a and d, alternate cells receiving the liquid to be osmosed and intermediate cells the osmosing liquid or the liquid to be dialyzed into. Where caustic soda is to be removed from a waste solution, such solution is introduced into the conduit c, issues through the apertures 21, eventually passes out through aperture 22 into conduit b, and is then withdrawn from the apparatus. Water is introduced into conduit a, issues from apertures 20, escapes from the cell through aperture 23 into conduit d, and then flows out of the apparatus.

It is during the time that the two liquids are flowing in opposite directions along the surfaces of the intermediate membranes that the caustic passes through the membrane into the body of water in the water cell, leaving behind it impurities not desired.

That portion of the mechanism which is provided for the purpose of supplying the cells with water and caustic solution, and for conducting away from the apparatus the recovered caustic and the waste solution will now be described. Positioned at a substantially higher elevation are supply tanks for the liquids to be passed through the machine, a tank 40 for the caustic solution, and a tank 41 for water. These tanks are provided with means, for instance float valves, for maintaining the levels of the liquids therein at constant elevations. From tank 40 caustic solution is led downwardly through a pipe 42 with which is associated a needle valve 43 for regulating the rate of flow therethrough. Immediately below the discharge end of pipe 42 is the open upper end of a flow metering vessel 44. This vessel has a calibrated orifice 45 at its lower end positioned directly over a funnel 46 rigid with the upper end of a conduit or pipe 47. Within the vessel 44 is a vertically extending tube 48, which tube is vertically adjustable so that its upper end may be raised or lowered as desired and, by raising or lowering the tube 48 the level of the surface of the liquid in vessel 44 may be raised or lowered and hence the pressure head upon the calibrated orifice 45 varied to increase or decrease the flow therethrough as may be desired. Needle valve 43 may also be manipulated to accomplish the same purpose.

Fluid is preferably delivered to vessel 44 at a slightly greater rate than it escapes through orifice 45 in order that the upper surface of the body of liquid therein may not fall below the level of the upward end of tube 48 and hence there is an overflow through tube 48. This overflow passes downwardly through a tube 50, portion of which is shown in Figure 2, to a sump, where the overflow is collected and returned to the supply tank 40. The caustic which enters the upper end of conduit 47 descends and is discharged into the bowl 51 of a liquid column device which comprises, in addition to bowl 51, the vertically extending outer glass tube 52 and the vertically disposed inner glass tube 53 within the outer tube and which extends downwardly through an aperture formed in the bottom of bowl 51, with which aperture it makes a liquid-tight joint so that liquid cannot escape from the bowl, or from the tube, unless the level thereof rises above the upper end of the inner tube 53. When this occurs, liquid will overflow into the upper end of tube 53 and escape from the lower end of this tube below bowl 51, falling into a funnel or liquid collecting device 54 and thence passing downwardly through tube 55 into sump or collecting basin 56, which basin also receives the overflow from the flow metering vessel 44. At bowl 51 air is eliminated, passing upwardly through tube 52 and thus escaping, and the liquid passes into a conduit 57 which leads downwardly therefrom and opens into a conduit 58 which opens directly into the conduit c, previously referred to, so that the liquid which passes downwardly from supply tank 40, after passing through a flow metering vessel, and the liquid column device described, is introduced into the bottom of a cell intermediate two membranes. It is preferred that the liquid caustic be so introduced.

The upwardly flowing caustic solution eventually passes into the conduit b, flows forwardly through such conduit and into the short conduit 60 which connects conduit b and the bowl 61 of a second liquid column device which is similar to that already described, comprising in addition to the bowl the vertically disposed outer glass tube 62 and the vertically adjustable inner tube 63. The liquid discharged into bowl 61 will rise in tube 62 and overflow into the upper end of inner tube 63, then pass downwardly and fall into a funnel or collecting vessel 64. From funnel 64 this liquid will pass downwardly through tube 65 to a point of discharge, which may be a sewer, since the caustic has in very large part been removed therefrom during passage through the apparatus and the waste liquid is therefore no longer of value.

The water from constant level supply tank 41 is conducted downwardly through conduit 68, past regulating valve 69, through flow metering vessel 70, which is exactly similar to that previously described and employed for regulating the flow of liquid caustic, into funnel 71, pipe or conduit 72, conduit 73, through the liquid column device, generally indicated at 74, and which is similar to those previously described, and thence through tube 75 directly into the end of conduit a. The inner tube 76 of the liquid column device is vertically adjustable and overflow from the device is conducted downwardly and discharged into a funnel 77 upon the upper end of a conduit 78 through which any overflowing water may be conducted away to a sewer or other point of disposition. The water which is delivered into conduit a finds its way into and downwardly through intermediate cells of the apparatus, into conduit d where it is collected. Conduit d is in direct communication with pipe or duct 80 which leads into vertically extending duct 81, the upper end of which opens into the bowl 82 of a fourth liquid column device, also comprising the outer glass tube 83 and the inner vertically adjustable tube 84. Tube 84 discharges into a funnel 85 upon the upper end of a conduit 86, which conduit leads to a storage tank since it is this liquid, comprising a solution of caustic soda in water, which it is the function of the machine to produce. It is known that due to the varying gravities of the liquids in both cells from top to bottom, or vice versa as the case may be, it is impossible to balance osmotic pressure uniformly over the entire area of a membrane. However, it is possible by being able to control the static pressures in both the water and caustic cells with relation to each other, without altering the flows through the machine, to establish operating conditions decidedly favorable to the life of the membranes.

In the drawings, Figures 1 and 2, the apparatus is shown to be adjusted for the dialysis of a caustic soda solution, the solution flowing upwardly and the water downwardly. When other liquids are passing through the apparatus the directions of flow may be reversed if desired, the apparatus being freely reversible and the fluid stream discarded in the process of recovering caustic soda, i. e., that issuing from pipe 65 being sent to a recovery tank instead of a sewer or the like, and that issuing from pipe 86 directed into a sewer.

The volume of fluid passing through the apparatus in any given time is determined by the adjustment of the fluid metering devices provided. The four glass head tubes provided in addition to the fluid metering devices 44 and 70 enable the operator to further control the process very precisely, and have additional advantages. Thus the tubes through which the incoming water and caustic solutions pass permit the escape of air from such solutions, the upper ends of these tubes being open to the atmosphere, and the fluids flowing into the cells are rendered substantially free of air. The inner tubes 53 and 76 provide safety overflows, terminating below the upper ends of the outer tubes with which they are associated. These head tubes likewise permit ready reading of the heads upon the incoming liquid streams.

Tube 62, in conjunction with its inner tube 63, determines the static head in the liquid to be dialyzed (caustic solution in this case) and tube 83, in conjunction with its adjustable inner tube 84 determines the static head in the cells containing the liquid to be dialyzed into (water in this instance). It is clear that if the level of the liquid (waste caustic solution) in tube 62 is raised, the level in tube 52 will be correspondingly raised, and the static pressure in cells containing the fluid to be dialyzed will be raised with respect to the level of the liquid to be dialyzed into (water). The reverse is true if the level in tube 62 is maintained constant and the level of the recovery liquid in tube 83 raised. Thus the static pressure in one set of cells may be made inferior or superior to the static pressure existing in the set of alternate cells and each membrane may be positioned so as to rest against either one or the other of the supporting grids between which it is located. The relative static pressures in the two sets of cells can be controlled, and the membranes deflected as desired, without altering the rate of flow of either liquid passing through the apparatus, which flow as has been previously pointed out may be modified by adjusting the metering devices described.

For the purpose of draining the apparatus, and the liquid conduits associated with it, tubes 90 and 91 are provided, which tubes are in communication with all of the liquid conduits of the apparatus and which also communicate with a discharge tube 92. Valves 93, 94 and 95 are always closed during the operation of the apparatus and hence the liquids must follow the courses heretofore described in detail. When valves 93, 94 and 95 are opened, however, the entire apparatus will be drained.

It is found to be of considerable advantage to have the apertures $a$ and $b$ closely spaced and positioned centrally of the upper cross members of the several frames. Heretofore it has been considered most desirable to have the apertures corresponding to those indicated at $a$ and $c$ at the corners of the frames. I have discovered, however, that by positioning the apertures centrally of the frames it is possible to more rapidly and thoroughly free the cells of air when it is attempted to first fill the apparatus with liquid. Any air contained in the cells seems to flow more readily toward the center than toward the corners of the frames, and escapes freely.

Having thus described the invention, what is claimed as new and desired to be secured by Letters Patent is:

1. A membrane support for use in a dialyzer comprising a generally flat member having a plurality of relatively thin parallel spaced ribs projecting laterally therefrom the outer edge surfaces of which are disposed substantially in a plane parallel to said member, the heights of said ribs being such that a membrane resting against said surfaces and sagging toward said member intermediate said ribs will contact with said edges only and be held wholly out of contact with other surfaces of said member and ribs, said member being perforated intermediate said ribs.

2. The combination set forth in claim 1 in which said member comprises a single metallic sheet and the ribs are integral portions thereof, each rib consisting of two contacting thicknesses of metal connected together at their outer edges.

3. The combination set forth in claim 1 in which said member is fabricated of sheet metal and alternate ribs project in opposite directions, each rib consisting of two contacting strips of metal interconnected at their outer edges, the portions of said member intermediate the ribs being flat and alternate portions being equally and oppositely inclined to the plane of the outer edge surfaces of the ribs.

GEORGE HUNT WEBER.